United States Patent
Wu et al.

(10) Patent No.: US 9,311,744 B2
(45) Date of Patent: Apr. 12, 2016

(54) SYSTEM AND METHOD FOR GENERATING AN OUTER LAYER REPRESENTATION OF AN OBJECT

(71) Applicants: Wen-Jun Wu, Novi, MI (US); Natalia Hortig, Rochester Hills, MI (US); Kevin Mojek, Oxford, MI (US)

(72) Inventors: Wen-Jun Wu, Novi, MI (US); Natalia Hortig, Rochester Hills, MI (US); Kevin Mojek, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 513 days.

(21) Appl. No.: 13/735,200

(22) Filed: Jan. 7, 2013

(65) Prior Publication Data

US 2013/0176311 A1 Jul. 11, 2013

Related U.S. Application Data

(60) Provisional application No. 61/584,408, filed on Jan. 9, 2012.

(51) Int. Cl.
*G06T 17/00* (2006.01)

(52) U.S. Cl.
CPC .............. *G06T 17/00* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 6,501,471 B1 | 12/2002 | Venkataraman et al. | |
| 6,647,306 B2 | 11/2003 | Wu et al. | |
| 6,674,430 B1 | 1/2004 | Kaufman et al. | |
| 6,968,299 B1 | 11/2005 | Bernardini et al. | |
| 7,173,615 B2 | 2/2007 | Hux | |
| 7,299,684 B2 | 11/2007 | Wu et al. | |
| 2002/0151999 A1 | 10/2002 | Wu et al. | |
| 2005/0128195 A1 | 6/2005 | Houston et al. | |
| 2005/0146522 A1* | 7/2005 | Maillot | 345/423 |
| 2008/0030500 A1* | 2/2008 | Krishnan et al. | 345/424 |
| 2008/0278484 A1* | 11/2008 | Payandeh et al. | 345/419 |
| 2008/0297507 A1* | 12/2008 | Chen et al. | 345/424 |
| 2010/0182344 A1* | 7/2010 | Lee | 345/672 |

* cited by examiner

*Primary Examiner* — James A Thompson
*Assistant Examiner* — Xilin Guo
(74) *Attorney, Agent, or Firm* — Ralph E. Smith

(57) ABSTRACT

A system and method for generating a representation of an outer layer of a three-dimensional object is disclosed. The object is represented by a plurality of two-dimensional triangles. The method comprises receiving the plurality of two-dimensional triangles representing the object and determining a three-dimensional bounding box comprised of a plurality of voxels that encapsulates the object. The method also includes determining an intersecting set of voxels of the plurality of voxels. A member of the intersecting set of voxels intersects with at least one triangle of the plurality of triangles. The method also includes determining an outer set of voxels from the intersecting set of voxels, wherein a member of the outer set of voxels shares a face with a voxel that is not a member of the intersecting set of voxels. The method further includes determining an outer layer set of triangles from the plurality of triangles.

16 Claims, 7 Drawing Sheets

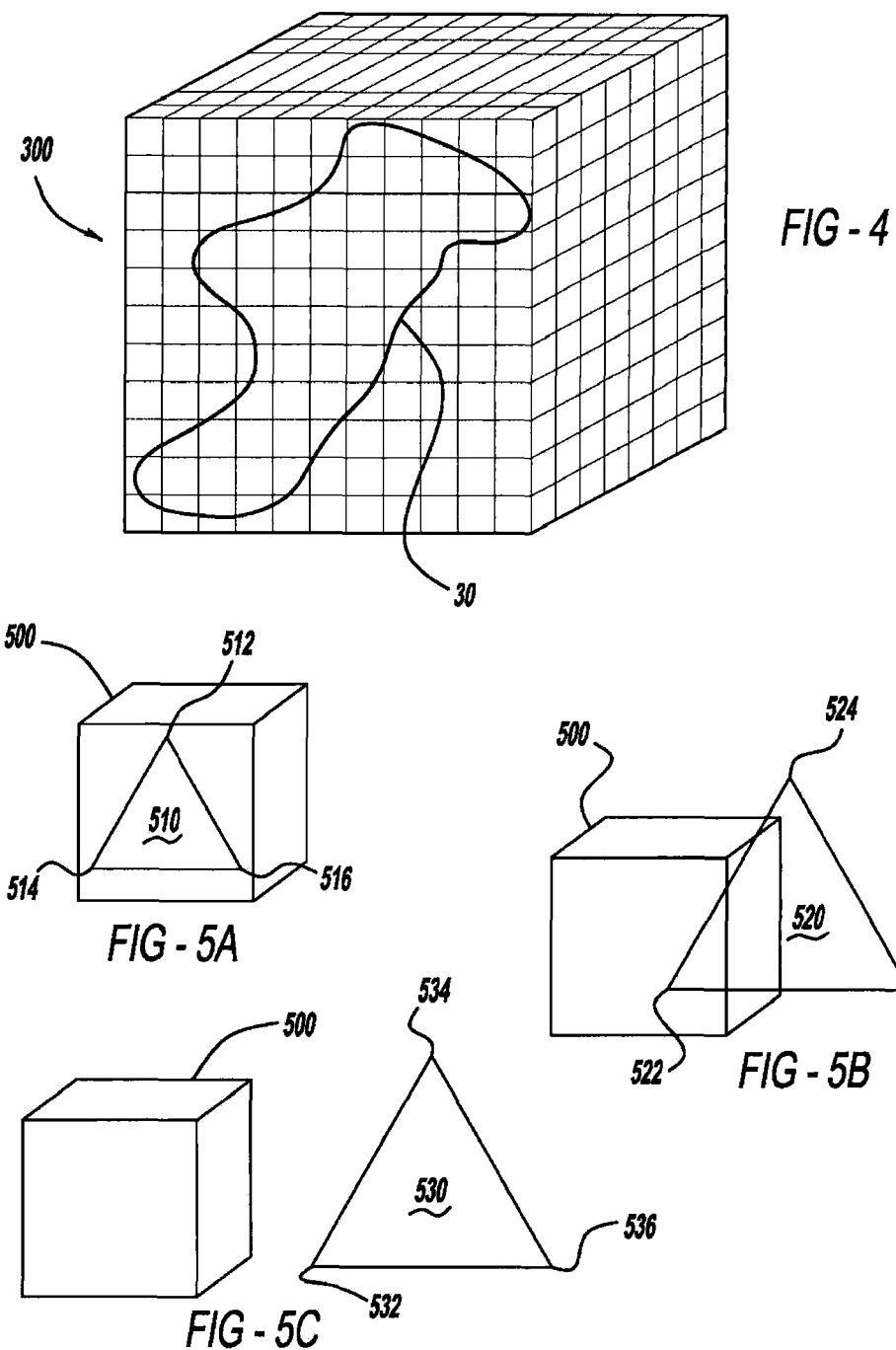

SYSTEM AND METHOD FOR GENERATING AN OUTER LAYER REPRESENTATION OF AN OBJECT

CROSS-REFERENCE TO RELATED APPLICATION

This application claims the benefit of U.S. Provisional Ser. No. 61/584,408, filed Jan. 9, 2012.

FIELD

The present disclosure relates to a system and method for generating an outer layer representation of a three-dimensional representation of an object.

BACKGROUND

Three-dimensional (3d) representations of objects are used in many different fields. For instance, 3d representations of objects are used to design parts and for performing analytical applications such as safety testing, vibration analysis, and computational fluid dynamics analysis. 3d representations of an object are typically comprised of millions or tens of millions of triangles, where each triangle can be represented by 3 vertices, having three coordinates apiece. Each coordinate is typically represented by a floating point decimal, which is typically represented by 24 bits. Thus, a 3d representation of an object that is comprised of 10,000,000 triangles can take up to 2 GB to represent. In applications that require complex computations to analyze the motion of the object, the computational resources that are required to handle a 2 GB 3d representation of an object are great. For example, a complex vibration analysis performed on a 3d representation of an engine may take up to 70 hours to execute on multiple processors. Thus, there is a need for an efficient manner to represent a 3d representation of an object.

Further, in the supply chain environment, it is common place for a product manufacturer to outsource the production of ancillary components, e.g., widgets such as hoses, screws, and clips, to a third party. The manufacturer will typically send a CAD design of an object to a third party, so that the third party can design an ancillary component therefor. The design of the primary component, however, may contain representations of internal components that are not meant for the third party's viewing. By providing a full CAD design of the primary product to the third party, the third party can inspect the internal components of the primary product. Thus, there is a need for an efficient manner for rendering an outer layer of a 3d representation of an object.

SUMMARY

In one aspect of the disclosure, a method for generating a representation of an outer layer of a three-dimensional object is disclosed. The object is represented by a plurality of two-dimensional triangles. The method comprises receiving the plurality of two-dimensional triangles representing the object and determining a three-dimensional bounding box having dimensions sufficient to encapsulate the object. The bounding box being is comprised of a plurality of voxels. The method further includes determining an intersecting set of voxels from the plurality of voxels. Each member of the intersecting set of voxels intersects with at least one triangle of the plurality of triangles. The method further comprises determining an outer set of voxels from the intersecting set. Each member of the outer set of voxels shares a face with a voxel that is not a member of the intersecting set of voxels. The method also includes determining an outer layer set of triangles from the plurality of triangles, the outer layer set of triangles being comprised of triangles that have three vertices that intersect the outer set of voxels.

In another aspect of the disclosure, a system for generating a representation of an outer layer of a three-dimensional object is disclosed. The object is represented by a plurality of two-dimensional triangles. The system comprises a bounding box determination module that receives the plurality of two-dimensional triangles representing the object and that determines a three-dimensional bounding box having dimensions sufficient to encapsulate the object, the bounding box being comprised of a plurality of voxels. The system further comprises an object-to-voxel module that determines an intersecting set of voxels from the plurality of voxels. Each member of the intersecting set of voxels intersects with at least one triangle of the plurality of triangles. The system further includes an outer layer determination module that determines an outer set of voxels from the intersecting set of voxels. Each member of the outer set of voxels shares a face with a voxel that is not a member of the intersecting set of voxels. The outer layer determination module further determines an outer layer set of triangles from the plurality of triangles, the outer layer set of triangles being comprised of triangles that have at least one vertex that intersect the outer set of voxels.

Further areas of applicability of the teachings of the present disclosure will become apparent from the detailed description and the drawings provided hereinafter. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

The description herein makes reference to the accompanying drawings where the reference numerals refer to like features throughout the several views.

FIG. 4 is a drawing illustrating an exemplary bounding box with a representation of an object embedded therein;

FIGS. 5A-C are drawings illustrating a voxel in relation to intersecting and non-intersecting triangles;

DETAILED DESCRIPTION

The present disclosure relates to a system and method for rendering an outer layer of a 3d representation of an object. The outer layer can be thought of as a skin of the object. The outer layer of a 3d representation of the object can be used in lieu of the 3d representation of the object in many applications.

Figure 1:
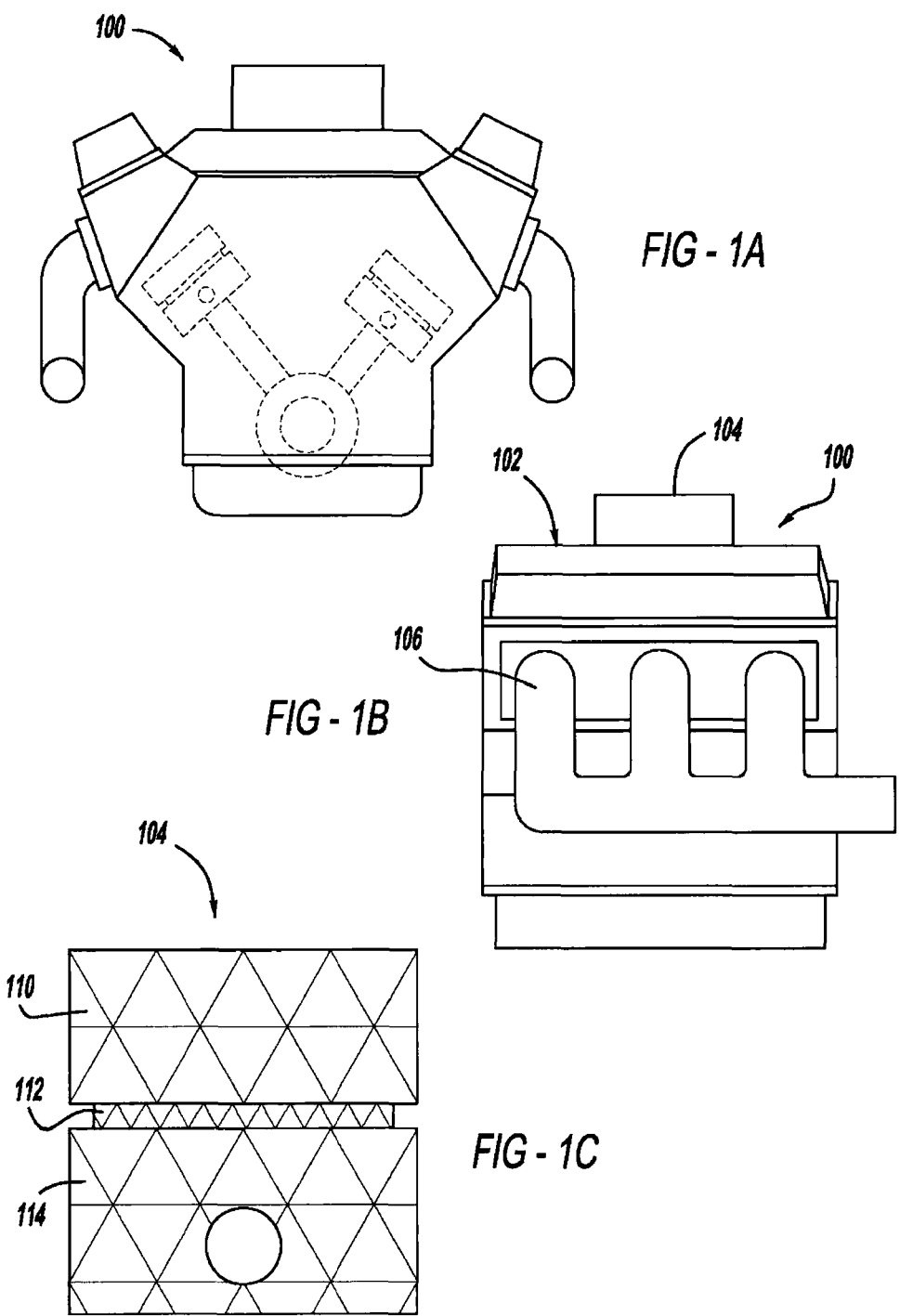
FIG. 1A is a drawing illustrating an exemplary representation of a three-dimensional object.
FIG. 1B is a drawing illustrating a cross-sectional view exemplary representation of a three-dimensional object.
FIG. 1C is a drawing illustrating a component of the three-dimensional object made up of a plurality of triangles.

Referring to FIG. 1A, an exemplary *3d* representation 100 of an object is depicted. The 3d representation 100 can be of any type of object. The 3d representation is a representation of the entire object, including the internal components of the object. For instance, FIG. 1B illustrates a cross-sectional view of the 3d representation 100. As can be seen, the 3d representation 100 includes the internal components 102, 104, and 106 of the object.

A 3d representation of an object is generated using a plurality of triangles. Each component 102, 104, or 106 is comprised of thousands or millions of triangles, which form the entire object, including wholly contained portions of the object. FIG. 1C illustrates an exemplary component 102 of the 3d representation 100. As can be seen, the exemplary component 102 is represented by a plurality of triangles, including a first triangle 110, a second triangle, 112, and a third triangle 114. It is appreciated that the triangles may be of different sizes, areas, and angles.

A triangle can be represented by three vertices, where each vertex defines a point in a space or a point in relation to the other triangles. Thus, each vertex in a 3d representation may include 3 values, i.e., an x-value, a y-value, and a z-value. For example only, a triangle can be represented by the following data structure:

```
Triangle{
    float first_vertex[3];
    float second_vertex[3];
    float third_vertex[3];
}
```

As can be appreciated, each vertex is represented by a floating point decimal to provide an accurate representation of the object. It is appreciated that the triangle does not need to be represented by floating point decimals, and can be represented by other variable types as well. But for purposes of example, an exemplary floating point decimal may be represented by a predetermined amount of bits, e.g., 48 bits. Thus, for each vertex, 144 bits may be used to represent the vertex and 432 bits to represent the triangle. In a complex object, such as a vehicle engine, the complex object may be represented by 10,000,000 triangles, which is approximately 4 GB. As mentioned, many analytical computations may require iterative rendering of these complex objects. Thus, the amounts of computational resources to perform these computations can become very large.

Figure 2:
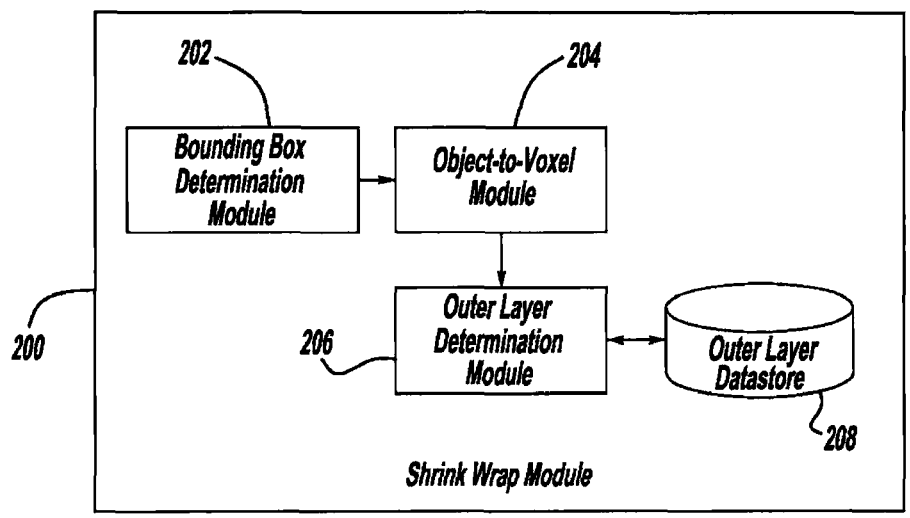
FIG. 2 is a block diagram illustrating exemplary components of a shrink wrap module.

FIG. 2 illustrates an exemplary shrink wrapping module 200. The shrink wrapping module 200 receives a 3d representation of an object and determines an outer layer of the 3d representation. The shrink wrapping module 200 is comprised of a bounding box determination module 202, an object-to-voxel module 204, an outer layer determination module 206, and an outer layer datastore 208. An exemplary shrink wrapping module 200 is comprised of computer readable instructions that are executed by a processor. The computer readable instructions can be stored in a computer readable medium, such as a hard disc drive, read-only memory, random access memory, optical storage, or any other memory device.

Figure 3:
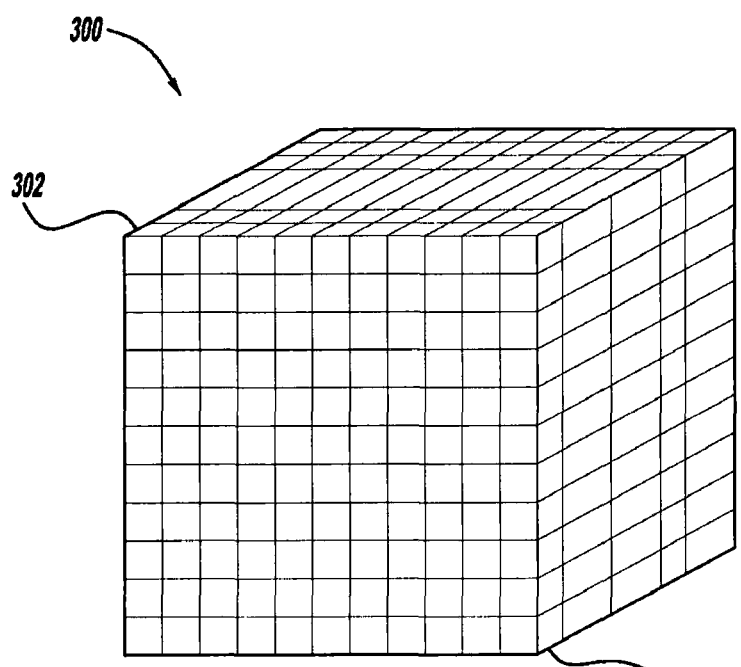
FIG. 3 is a drawing illustrating an exemplary bounding box.

The bounding box determination module 202 receives a 3d representation 100 of an object from an object source. The object source may be a user or another application. The bounding box determination module 202 will determine a bounding box that fits around the object. FIG. 3 illustrates an exemplary bounding box 300. A bounding box 300 is a 3d space with defined parameters, which contains all the points in the received object. It is appreciated that the bounding box can be a cube, a cuboid, a rectangular prism, a hexahedron, a sphere, a pyramid, or any other 3d shape. In some embodiments, a minimum-perimeter bounding box is used.

The bounding box is divided into a plurality of voxels, e.g. voxel 302 and voxel 304. A voxel is a volumetric pixel, or a 3d pixel. The bounding box 300 has i voxels spanning the width of the bounding box 300, j voxels spanning the height of the bounding box 300, and k voxels spanning the depth of the bounding box 300. Thus, the bounding box 300 is comprised of i×j×k voxels. The voxels can represent a predetermined amount space. For instance, one voxel may represent a 2 mm×2 mm×2 mm space. It is appreciated that because the voxels are located a predetermined location and are of predetermined size, the voxels can be represented by a single point representing a predetermined location, e.g., the top front left corner of the voxel or the center point of the voxel. In some embodiments, a voxel is represented by a data structure that includes a reference vertex and a state variable indicating a state of the voxel. As will be discussed below, the state variable can be used to identify whether the corresponding voxel is intersected by the 3d representation of the object, whether the voxel is an outer layer of a voxel representation of the 3d representation of the object, or whether the voxel is a non-intersecting voxel. Initially, the voxels all have a default value, e.g., 0. The default value indicates that the corresponding voxel has not yet been determined to be in the intersecting voxels, either because it is not an intersecting voxel, or the voxel has not yet been analyzed. The voxel may also include an array of pointers that point to the neighboring voxels. Each element in the array would point to the voxel that shares a particular face with the voxel. Thus, the array would include 6 pointers, one pointer for each face of the voxel. An exemplary voxel data structure is provided below:

```
Voxel{
    int start_point[3];        //reference point for the voxel
    voxel * neighbor[6];       //each element points to a neighbor
    char state_variable = 0;   //set to default value
}
```

It is appreciated that other data structures may be used in place of the foregoing. For instance, a data structure may not include a neighbor array. Rather, neighbors of a voxel can be referenced by incrementing or decrementing one of the x, y, or z values in start_point. For example, where a voxel has an upper, left, front corner at 4,4,4 and each voxel is 2×2×2 in volume, neighboring voxels can be determined by adding two or subtracting two from one of the x, y, or z values of the voxel. Thus, in this example, the upper neighbor (assuming the z direction is up) would have an upper, left, front corner at 4, 4, 6 and the lower neighbor would have an upper, left, front corner at 4, 4, 2.

The bounding box determination module 202 is further configured to embed the object into the bounding box 300.

FIG. 4 illustrates an object contained within the bounding box 300. The bounding box determination module 202 can embed the 3d representation of the object into the bounding box 300 in any suitable fashion. Further, it is appreciated that embedding the object may be performed by ensuring that the vertices of the triangles are in the same space as the bounding box, e.g. both in a Cartesian space and the vertices of the triangles are all within the domain of the bounding box 300.

Referring back to FIG. 2, the object-to-voxel module 204 receives the bounding box 300. It is noted that the 3d representation of the object may be embedded therein. The object-to-voxel module 204 determines a voxel representation of the 3d representation. It is appreciated that the voxel representation of the 3d representation is akin to a model made of blocks, as the smallest unit of the voxel representation is a voxel. The object-to-voxel module 204 can determine an intersecting set of voxels, such that any voxel that contains at least one vertex and/or edge of a triangle is included in the intersecting set of voxels. Further, in some embodiments, the intersecting set of voxels may include any triangles which interfere with a voxel, i.e., at least one point in the triangle is contained in the voxel or at least one point in the voxel is contained in the triangle.

Referring to FIG. 5A-5C, examples of a voxel 500 in relation to intersecting triangles 510 and 520 and non-intersecting triangles 530 are depicted. In FIG. 5A, all three vertices 512, 514, and 516 of the triangle 510 are contained in the voxel 500. Thus, triangle 510 intersects the voxel 500. In FIG. 5B only one vertex 522 is located in the voxel 500, and two vertices 524 and 526 are located outside the voxel 500. In this example, triangle 520 intersects the voxel 500. In FIG. 5C, all three vertices 532, 534, and 536 of the triangle 530 are located outside the voxel. Thus, the triangle 530 does not intersect the voxel 500.

Referring back to FIG. 2, the object-to-voxel module 204 analyzes the triangles of the 3d representation of the object to determine which voxels the triangles intersect with. If a triangle has at least one vertex or edge within a voxel, the object-to-voxel module 204 changes the value of the state variable to a first value, e.g., 1, that indicates that the voxel is intersected by at least one triangle. Once all the triangles or voxels have been analyzed, the set of voxels having a state variable equal to 1 can be considered a voxel representation of the object.

Once the voxel representation of the object has been determined, the outer layer determination module 206 receives the voxel representation of the object and determines a set of triangles comprising the outer layer of the 3d representation of the object, e.g., the skin of the object. As an intermediate step, the outer layer determination module 206 may determine an outer set of voxels, where a member of the outer set of voxels shares at least one face with a non-intersecting voxel. A non-intersecting voxel is a voxel that does not intersect the 3d representation of an object and, therefore, is not in the voxel representation of the object, i.e., a voxel having a state variable equal to the default value. The outer layer determination module 206 then determines which triangles have three vertices residing in the outer set of voxels. If a triangle has all three vertices in one or more voxels in the outer set of voxels, then the triangle is included in the outer layer set of triangles, i.e., the skin of the object. The outer layer set of triangles can then be stored in the outer layer datastore 208, can be used by a testing module, or can be provided to a third party.

Figure 6:
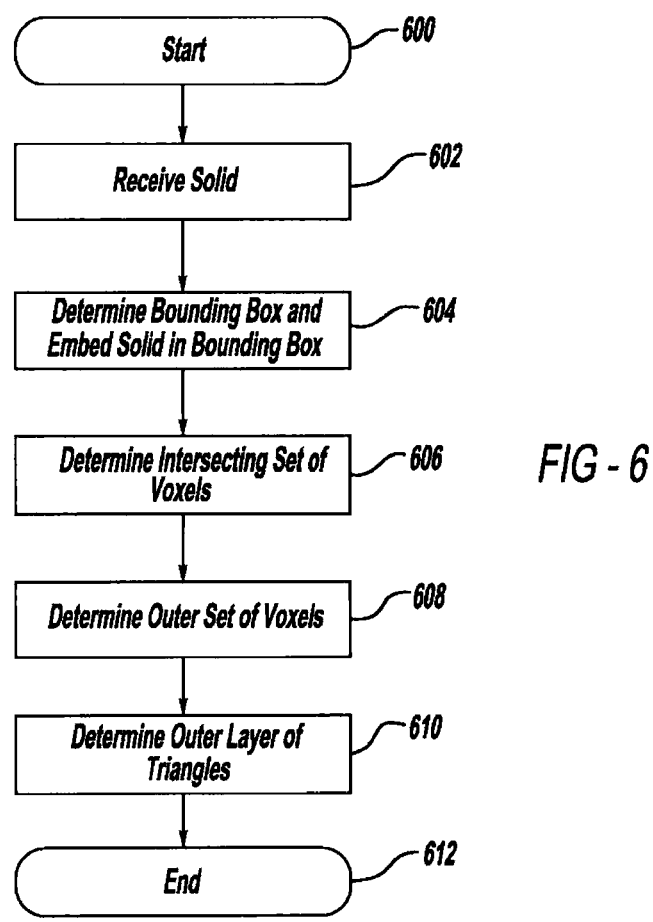
FIG. 6 is a flow chart illustrating an exemplary method for determining an outer layer of an object.

FIG. 6 illustrates an exemplary method for generating an outer layer of a 3d representation of an object. As described above, the shrink wrap module 200 receives a 3d representation of an object, as shown at step 602. As previously discussed, the 3d representation of an object is a set of triangles, wherein each triangle is represented by three vertices. It is appreciated, however, that while the use of triangles is described, any other type of polygons may be used.

Upon receiving the 3d representation of the object, the bounding box determination module 202 will determine a bounding box for the 3d representation of the object, as shown at step 604. In some embodiments, the bounding box determination module 202 will determine the minimum and maximum x-values, y-values, and z-values in the entire set of triangles. For example, the bounding box determination module 202 can sort the x-components of each vertex of each triangle, the y-components of each vertex of each triangle, and the z-components of each vertex of each triangle. The maximum value and the minimum value of each set of components would define the maximum and minimum x, y, and z values of the bounding box. Further, in some embodiments, the bounding box determination module 202 can add an extra layer of voxels around the bounding box, such that the representation of the object does not intersect any of the voxels located at the outer edge of the bounding box 300.

The bounding box determination module 202 further defines the voxels of the bounding box. The size of each voxel with respect to the object can be defined by a user. The bounding box determination module 202 initializes the state variable value of each voxel to the default value, e.g., 0.

The bounding box determination module 202 may also embed the 3d representation of the object into the bounding box, as also shown at step 604. The term embed is used broadly, as the bounding box determination module 202 may simply adjust the values of the coordinates of the voxels to ensure that all of the triangles of the 3d representation of the object are contained within the domain of the bounding box 300.

Once the bounding box determination module 202 has determined a suitable bounding box for the 3d representation of the object, the object-to-voxel module 204 determines an intersecting set of voxels, as shown at step 606. A member of the intersecting set of voxels includes at least one vertex or edge of at least one triangle from the 3d representation of the object. Thus, the object-to-voxel module 204 can analyze each voxel to determine if at least one vertex of any triangle in the 3d representation is located in the voxel. If so, the state variable value of the voxel is changed to a first value, e.g., 1. Alternatively, the object-to-voxel module 204 can analyze each triangle and determine which voxel or voxels the triangle resides in. If the triangle is located within a particular voxel, the object-to-voxel module 204 adjusts the state variable value of the particular voxel to indicate the intersection. It is appreciated that the intersecting set of voxels can be used as a voxel representation of the object, as the intersecting voxels take up approximately the same area as the 3d representation of the object. It is noted, however, that the voxel representation of the object is not as smooth as the 3d representation when observed from a high resolution.

After the intersecting set of voxels has been determined, the outer layer determination module 206 determines an outer set of voxels at step 608. A voxel in the outer set of voxels has at least one face in common with a non-intersecting voxel, e.g., the voxel neighbors another voxel having the default value as the state variable value. That is, the outer set of voxels are the outermost voxels in the voxel representation of the object. It is appreciated that any suitable means for determining the outer set of voxels can be used.

Figure 7:
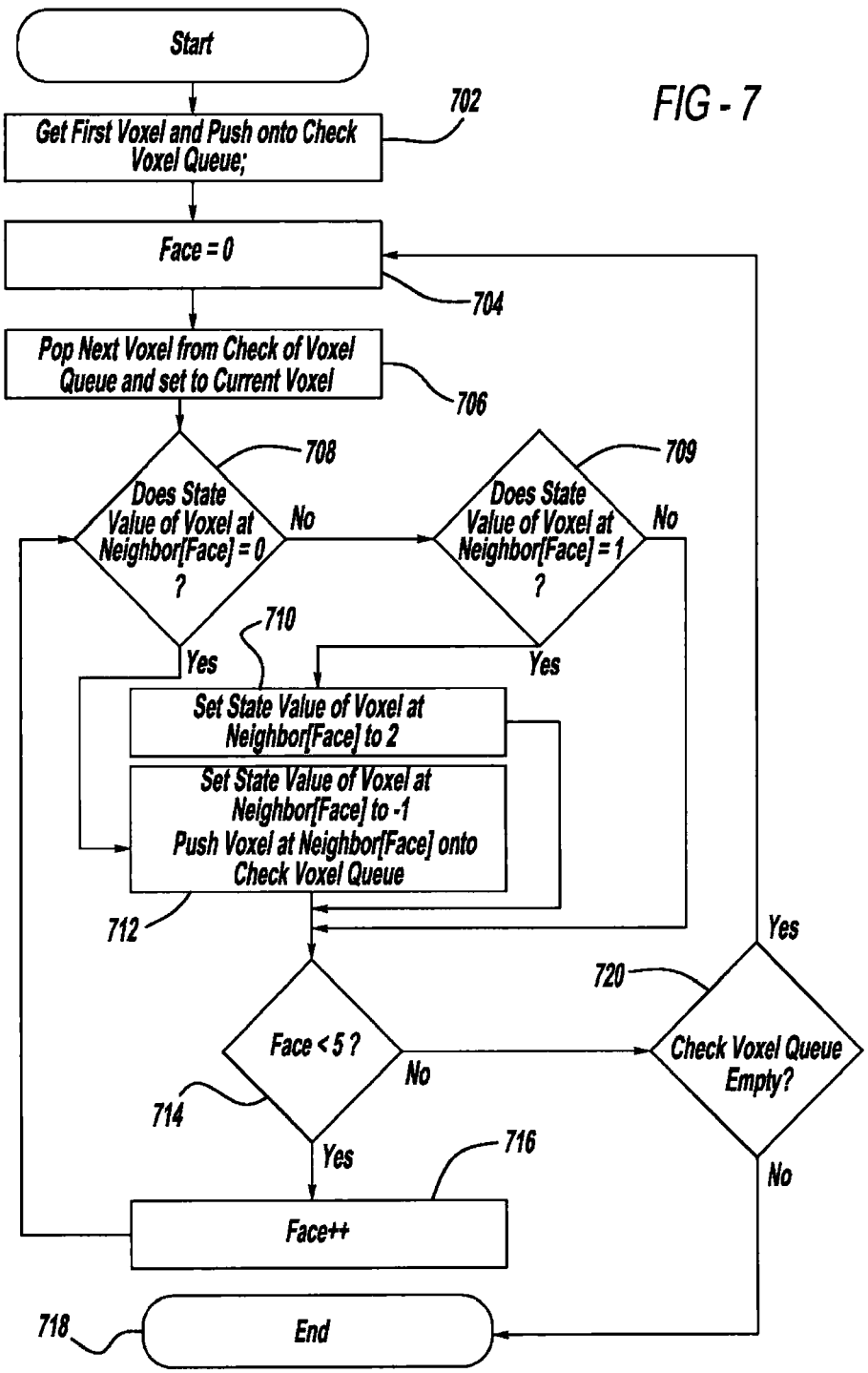
FIG. 7 is a flow chart illustrating an exemplary method for determining an outer set of voxels from a voxel representation of an object.

FIG. 7 illustrates an exemplary method for determining the outer set of voxels. The following method uses the definition of the voxel data structure described above, including the neighbor array that references the neighbors of a particular voxel at each face of the particular voxel. It is appreciated that the method can be altered to use a different data structure, and the method described above is provided for example only. Initially, the outer layer determination module 206 obtains a first voxel having a state variable value equal to the default value, e.g., 0. The first voxel is pushed onto a check voxel queue, as shown at step 702. It is appreciated that the queue can be a FIFO queue or a LIFO stack or a linked list, or any other means for keeping track of which voxels need to be checked. The voxels queued in the check queue are voxels determined to be not in the intersecting set of voxels, i.e., voxels having a state variable value equal to 0.

The outer layer determination module 206 will iteratively check the state variable value of each voxel neighboring each face of a current voxel. Thus, a face variable is initially set to 0, as shown at step 704. The face variable indicates a face of the current voxel that is to be analyzed in the coming iteration.

At step 706, the outer layer determination module 206 dequeues a voxel from the check voxel queue. The dequeued voxel is the current voxel, i.e., the voxel to be analyzed.

The outer layer determination module 206 checks the state values of the voxels neighboring the current voxel, as shown at step 708. Thus, the outer layer determination module 206 will read the state value of the neighboring voxel. If the state value of the neighboring voxel is equal to 0, the neighboring voxel is inserted into the check voxel queue, as shown at step 712. The state value of the neighboring value can be set to a value indicating that the voxel has been analyzed once and has been inserted into the check voxel queue. For example, the state value of the neighboring voxel may be set to −1, thereby indicating that the voxel has been checked.

If the state value of the neighboring voxel is not equal to 0, i.e. −1, 1 or 2, the outer layer determination module 306 determines whether the voxel has previously been checked. The outer layer determination module 306 checks the value of the neighboring voxel, as shown at step 709. If the value of the neighboring voxel is equal to 1, i.e., the voxel has not been analyzed but is a member of the intersecting set of voxels, the state value of the voxel is changed to 2 at step 710, thereby indicating that the voxel is a member of the outer layer of voxels. If the state value of the neighboring voxel is equal to −1 or 2, the voxel has already been analyzed and is hence, disregarded.

Once the neighboring voxel has been analyzed, the outer layer determination module 206 will determine whether all the faces of the current voxel have been analyzed, as shown at step 714. If not all of the neighboring faces have been analyzed, the face variable is incremented, as shown at step 716, and the outer layer determination module 206 analyzes the next face of the current voxel, as shown at step 708. If, however, all of the faces of the current voxel have been analyzed, then the outer layer determination module 206 checks the contents of the check voxel queue to determine if there are more voxels to analyze 720. If the check voxel queue is not empty, the outer layer determination module 206 resets the face variable and obtains the next voxel in the check voxel queue, as shown at steps 704 and 706. If no more voxels remain in the check voxel queue, the outer layer determination module 206 assumes that all of the non-intersecting voxels have been checked, ending the method for determining the outer set of voxels at step 718. It is appreciated that the following assumption holds true if the bounding box includes an outer layer of voxels that are all non-intersecting voxels. It is appreciated that the method may be altered to ensure that non-intersecting voxels have been analyzed.

It is appreciated that the foregoing method is provided for example only. Alternative methods for determining an outer layer of voxels can be used in place of the foregoing method. Further, the steps of the method can be altered, and some steps described above can be performed in multiple steps.

Figure 8:
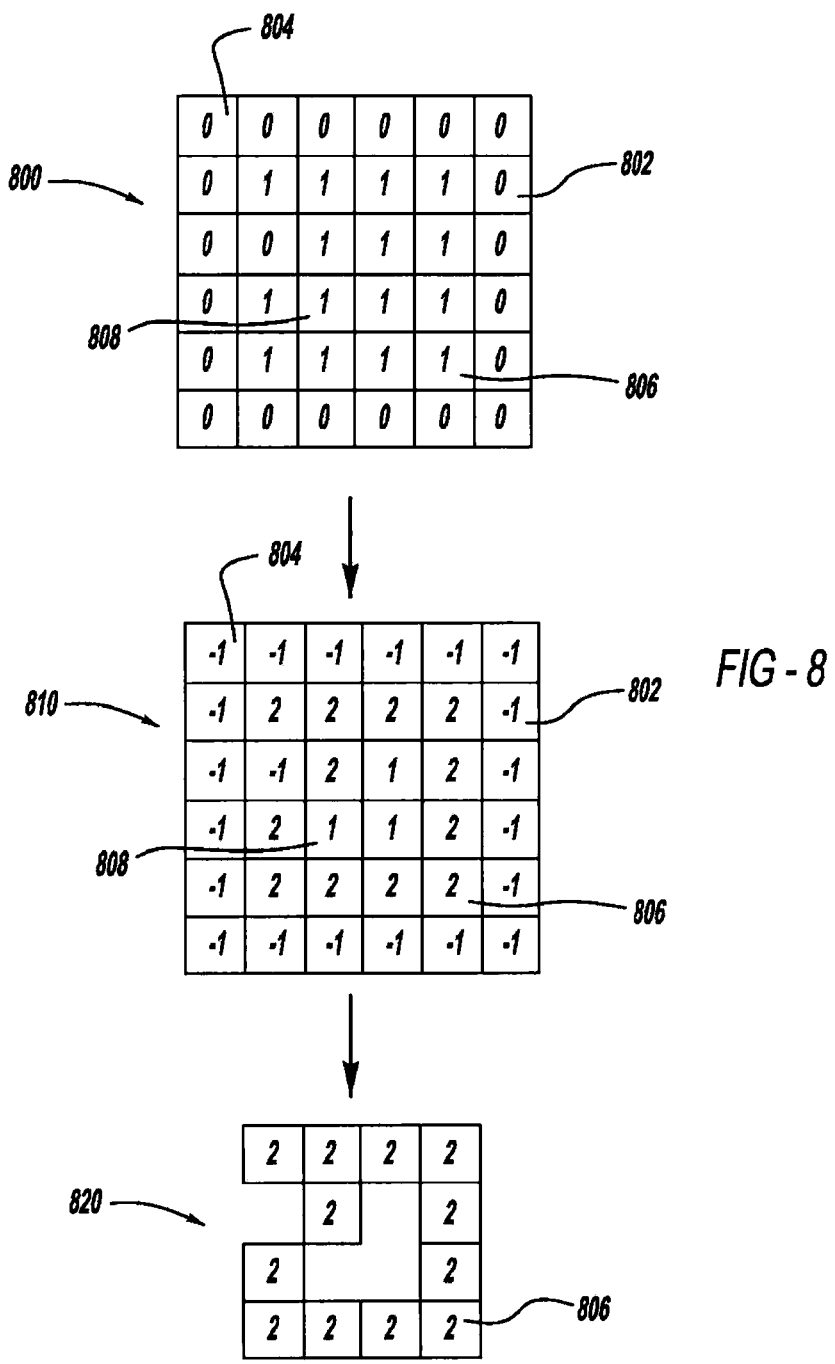
FIG. 8 is a drawing illustrating an outer set of voxels obtained from a voxel representation of an object.

Once the outer layer determination module 206 has executed the foregoing method or an equivalent thereof, the outer layer determination module 206 has determined an outer set of voxels. FIG. 8 illustrates an example of the outer layer of voxels. In FIG. 8, a two-dimensional bounding box is shown for example purposes only. The first bounding box 800 illustrates a 6 by 6 bounding box that has not been analyzed by the outer layer determination module 206. The voxels having a 0 displayed thereon, e.g., voxels 802 and 804, are non-intersecting voxels, and the voxels having a 1 thereon, e.g., voxels 806 and 808, are voxels in the intersecting set of voxels. The outer layer determination module 206 analyzes the non-intersecting voxels to determine all the voxels that neighbor at least one non-intersecting voxel. The state variable value of voxels in the intersecting set of voxels and neighboring a non-intersecting voxel is changed to 2, as shown in the second bounding box. For example, voxel 806 is in the intersecting set of voxels and neighbors a non-intersecting voxel. Thus, in bounding box 810, the state variable value of voxel 806 is changed to 2. Furthermore, because bounding box 810 illustrates the state of the voxels after the outer layer determination module 206 has determined an outer layer, the voxels that were previously set to 0, e.g. voxels 802 and 804, are set to −1, as those voxels have been analyzed. Once all the non-intersecting voxels have been analyzed, the outer set of voxels 820 can be identified and isolated from the intersecting set of voxels, as shown in FIG. 8.

Figure 9:
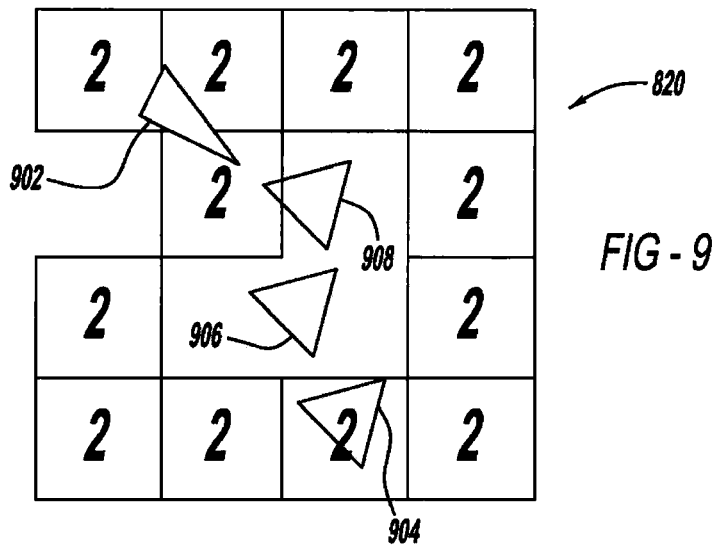
FIG. 9 is a drawing illustrating an outer set of voxels with intersecting and non-intersecting triangles.

Referring back to FIG. 6, the outer layer determination module 206 determines an outer layer of triangles based on the outer set of voxels and the triangles comprising the 3d representation of the object, as shown at step 610. The outer layer of triangles is a set of triangles that have at least one vertex in the outer set of voxels. In some embodiments, a triangle is included in the outer layer if and only if all three vertices are located in the outer set of voxels. In these embodiments, the outer layer determination module 206 checks the vertices of each triangle in the 3d representation of the object. If all three vertices of a triangle are located in voxels belonging to the outer set of voxels, e.g., voxels having a state variable value of 2, the outer layer determination module 206 includes the triangle in the outer layer set of triangles. If, however, a triangle does not have all three vertices located in voxels belonging to the outer set of voxels, then the triangle is disregarded and not included in the outer layer set of triangles. FIG. 9 illustrates an example of four triangles being analyzed with respect to the outer set of voxels 820 from FIG. 8. It is appreciated that all three vertices of triangles 902 and 904 are located in the outer set of voxels. Thus, triangles 902 and 904 are included in the outer layer set of triangles. Triangles 906 and 908 have vertices that are not located in the outer set of voxels. Thus, triangles 906 and 908 are not included in the outer layer set of triangles.

Once all of the triangles have been analyzed, the method stops executing. The triangles included in the outer layer set of triangles makes up the outer layer of the 3d representation, or the "skin" of the object. It is appreciated that the outer layer can be stored in the outer layer datastore 208.

The outer layer can also be used to provide a representation of an object to a third party manufacturer without divulging the interior components of the object to the third party. For example, an engine manufacturer may outsource the production of widgets for a particular engine to a third party manufacturer. The engine manufacturer may wish to provide the third party manufacturer with a 3d CAD representation of the engine so that the third party can design the customized widgets to fit the engine. The engine manufacturer, however, may not wish to divulge the internal components of the engine to the third party manufacturer. Thus, the engine manufacturer can generate an outer layer of the 3d CAD representation of the engine, as described above, and can provide the outer layer to the third party manufacturer.

The outer layer of an object can also be used by analysis applications. For example, the outer layer can be used to perform vibration analysis on an object. Vibration analysis is performed when designing objects that are expected to vibrate over extended period of time. For instance, vibration analysis is performed on representations of components of a vehicle.

Figure 10:
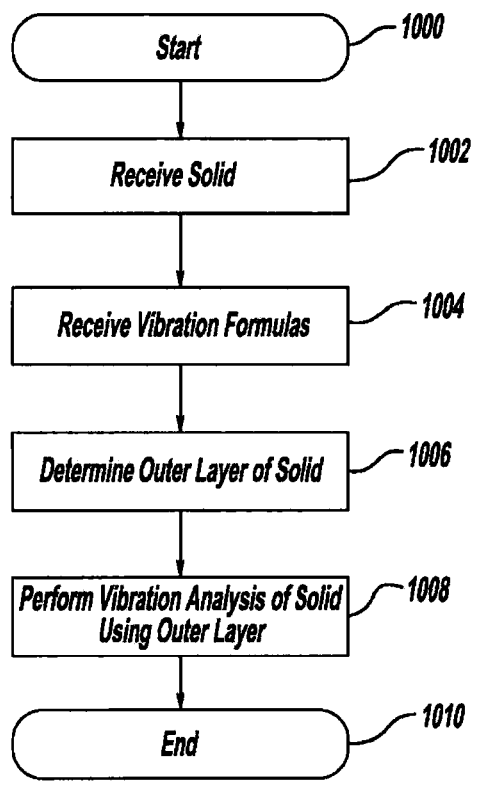
FIG. 10 is a flow chart illustrating an exemplary method for performing vibration analysis.

FIG. 10 illustrates an exemplary method for performing vibration analysis for an object. The method may be executed by an analysis engine (not shown), for example. The analysis engine can be used to calculate a vibration volume, i.e., the space taken up during a vibration period lasting time T. The analysis engine receives the 3d representation of an object, e.g., an engine, as shown at step 1002. The analysis engine also receives one or more formulas defining the factors that govern the vibration of the engine, as shown at step 1004. The formulas are defined as functions of time. The analysis engine then determines an outer layer set of triangles based on the 3d representation of the object, as shown at step 1006. The analysis engine can generate the outer layer set of triangles in any suitable fashion, including the manner described above. Further, the analysis engine may receive the formulas and the outer layer set of triangles, and therefore, may not calculate the outer layer set of triangles. Once an outer layer of the 3d representation of the object has been determined and the formulas governing the vibration of the object have been received, the analysis engine performs the vibration analysis on the object, as shown at step 1008. The analysis engine can perform vibration analysis in any suitable fashion.

In some embodiments, the vibration analysis engine will calculate the position of the outer layer of the object at each time instance between t=1 and t=T. After each iteration, the position information of the outer layer, i.e., the position of each triangle represented by the vertices of each triangle, can be combined with the previous position information from the previous calculations. This set can be thought of as the union of the position information for each iteration, which will be referred to as the union set. Once the T iterations have been performed, a new bounding box can be determined, such that the new bounding box represents the range of values of the entire union set. The new bounding box can be determined in the manner described above. The union set of triangles is then used to determine a voxel representation of the union set. That is, the union set of triangles is embedded in the new bounding box and an intersecting set of voxels is determined for the embedded union set, as described above. From the intersecting set of voxels, the outer layer of the union set can be calculated in the manner described above. The outer layer of the union set describes the vibration volume of the object. The vibration volume is the total space that is used during the vibration period. The vibration analysis engine then ends the method for performing vibration analysis for the object at step 1010. It is appreciated that other types of vibration analysis can be performed using the outer layer of the object.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, bytecode and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A method for generating a representation of just an outer layer of a three-dimensional object, the object represented by a plurality of two-dimensional triangles, the method comprising:

receiving the plurality of two-dimensional triangles representing the object;

determining a three-dimensional bounding box having dimensions sufficient to encapsulate the object, the bounding box being comprised of a plurality of voxels, wherein each voxel in the bounding box has a state value associated thereto, wherein the state value of each voxel is initially assigned a default value;

determining an intersecting set of voxels from the plurality of voxels, wherein each member of the intersecting set of voxels intersects with at least one triangle of the plurality of triangles;

changing the state value of the voxels in the intersecting set of voxels from the default value to a first value;

determining an outer set of voxels from the intersecting set of voxels, wherein each member of the outer set of voxels shares a face with a voxel that is not a member of the intersecting set of voxels;

determining a non-intersecting set of voxels from the plurality of voxels, wherein the state values of the voxels of the non-intersecting set of voxels are equal to the default value after the intersecting set of voxels is determined;

for each particular voxel having the first value as the state value:

identifying a neighboring voxel that shares a face with the particular voxel; and changing the state value of the neighboring voxel to a second value if the state value of the neighboring voxel is determined to be equal to the first value and the neighboring voxel shares a face with at least one voxel in the non-intersecting set of voxels; and isolating the voxels having the second value as the state value and generating the representation of just the outer layer of the three-dimensional objection therefrom.

2. The method of claim 1 wherein the bounding box is comprised of i×j×k voxels, where i is an amount of voxels across the width of the bounding box, j is an amount of voxels across the height of the bounding box, and k is the amount of voxels across the depth of the bounding box.

3. The method of claim 2 wherein determining the three-dimensional bounding box comprises determining a maximum width of the object, a maximum height of the object, and a maximum depth of the object, and wherein i, j, and k, are determined based on the maximum width, the maximum height, and maximum depth, respectively.

4. The method of claim 1 wherein the state values of each voxel in the intersecting set of voxels is assigned the first value.

5. The method of claim 4 wherein the outer set of voxels is comprised of a plurality of voxels that have state values equal to the second value.

6. The method of claim 5 wherein the step of changing the state value of the neighboring voxel to the second value further comprises:
   identifying a first non-intersecting voxel from the non-intersecting set of voxels;
   inserting the first non-intersecting voxel into a check queue;
   iteratively performing the following steps until the check queue is empty:
     removing a current voxel from the check queue;
     for each face of the current voxel,
       determining the state value of the neighboring voxel at the face, and inserting the neighboring voxel into the check queue if the state value of the neighboring voxel is equal to the default value, and
       changing the state value of the neighboring voxel to the second value if the state value of the neighboring voxel is determined to be equal to the first value.

7. The method of claim 5 wherein the determining the outer layer set of triangles comprises for each triangle in the object determining whether the three vertices of the triangle are located in at least one of the set of outer voxels, and if so, including the triangle in the outer layer set of triangles.

8. The method of claim 1 wherein a voxel is represented by a data structure containing a reference point of the voxel indicating a location within the bounding box, a state variable, and a neighbor array having six elements, each element pointing to a different neighboring voxel.

9. A system for generating a representation of just an outer layer of a three-dimensional object, the object represented by a plurality of two-dimensional triangles, the system comprising:
   a bounding box determination module that receives the plurality of two-dimensional triangles representing the object and that determines a three-dimensional bounding box having dimensions sufficient to encapsulate the object, the bounding box being comprised of a plurality of voxels, wherein each voxel in the bounding box has a state value associated thereto, wherein the state value of each voxel is initially assigned a default value;
   an object-to-voxel module that determines an intersecting set of voxels from the plurality of voxels, wherein each member of the intersecting set of voxels intersects with at least one triangle of the plurality of triangles, wherein the object-to-voxel module changes the state value of the voxels in the intersecting set of voxels from the default value to a first value; and
   a outer layer determination module that determines an outer set of voxels from the intersecting set of voxels, wherein each member of the outer set of voxels shares a face with a voxel that is not a member of the intersecting set of voxels and that determines an outer layer set of triangles from the plurality of triangles, the outer layer set of triangles being comprised of triangles that have at least one vertex that intersect the outer set of voxels, wherein the outer layer determination module determines a non-intersecting set of voxels from the plurality of voxels, wherein the state values of the voxels of the non-intersecting set of voxels are equal to the default value after the intersecting set of voxels is determined, wherein the outer layer determination module, for each particular voxel having the first value as the state value, identifies a neighboring voxel that shares a face with the particular voxel and changes the state value of the neighboring voxel to a second value if the state value of the neighboring voxel is determined to be equal to the first value and the neighboring voxel shares a face with at least one voxel in the non-intersecting set of voxels, and wherein the outer layer determination module isolates the voxels having the second value as the state value and generates the representation of just the outer layer of the three-dimensional object therefrom.

10. The system of claim 9 wherein the bounding box is comprised of i×j×k voxels, where i is an amount of voxels across the width of the bounding box, j is an amount of voxels across the height of the bounding box, and k is the amount of voxels across the depth of the bounding box.

11. The system of claim 10 wherein the bounding box determination module determines a maximum width of the object, a maximum height of the object, and a maximum depth of the object, and wherein i, j, and k, are determined based on the maximum width, the maximum height, and maximum depth, respectively.

12. The system of claim 9 wherein the state values of each voxel in the intersecting set of voxels is assigned the first value.

13. The system of claim 12 wherein the outer set of voxels is comprised of a plurality of voxels that have state values equal to the second value.

14. The system of claim 13 wherein the outer layer determination module:
   identifies a first non-intersecting voxel from the non-intersecting set of voxels;
   inserts the first non-intersecting voxel into a check queue; and
   iteratively performs the following steps until the check queue is empty:
     removing a current voxel from the check queue;
     for each face of the current voxel,
       determining the state value of the neighboring voxel at the face, and inserting the neighboring voxel into the check queue if the state value of the neighboring voxel is equal to the default value, and
       changing to the state value of the neighboring voxel to the second value if the state value of the neighboring voxel is determined to be equal to the first value.

15. The system of claim 13 wherein the outer layer determination module determines the outer layer set of triangles by determining for each triangle in the object whether at least one vertex of the triangle is located in at least one of the set of outer voxels, and if so, including the triangle in an outer skin set of triangles.

16. The system of claim 9 wherein a voxel is represented by a data structure containing a reference point of the voxel indicating a location within the bounding box, a state variable, and a neighbor array having six elements, each element pointing to a different neighboring voxel.

* * * * *